(12) United States Patent
Berberian

(10) Patent No.: US 10,079,975 B2
(45) Date of Patent: Sep. 18, 2018

(54) IMAGE DISTORTION CORRECTION OF A CAMERA WITH A ROLLING SHUTTER

(71) Applicant: MOBILEYE VISION TECHNOLOGIES LTD., Jerusalem (IL)

(72) Inventor: Yael Berberian, Jerusalem (IL)

(73) Assignee: Mobileye Vision Technologies Ltd., Har Hotzvim, Jerusalem (IL)

( * ) Notice: Subject to any disclaimer, the term of this patent is extended or adjusted under 35 U.S.C. 154(b) by 0 days.

(21) Appl. No.: 15/055,723

(22) Filed: Feb. 29, 2016

(65) Prior Publication Data

US 2016/0182793 A1  Jun. 23, 2016

Related U.S. Application Data

(63) Continuation of application No. 14/185,217, filed on Feb. 20, 2014, now Pat. No. 9,277,132.

(60) Provisional application No. 61/767,332, filed on Feb. 21, 2013.

(51) Int. Cl.
*H04N 5/232* (2006.01)

(52) U.S. Cl.
CPC ....... *H04N 5/2329* (2013.01); *H04N 5/23248* (2013.01); *H04N 5/23254* (2013.01); *H04N 5/23267* (2013.01)

(58) Field of Classification Search
CPC ............... H04N 5/2329; H04N 5/3532; H04N 5/23254; H04N 5/23248; H04N 5/23267
See application file for complete search history.

(56) References Cited

U.S. PATENT DOCUMENTS

| 6,307,959 | B1 | 10/2001 | Mandelbaum et al. |
| 7,844,134 | B2 * | 11/2010 | Sasaki ................ H04N 5/23248 348/222.1 |
| 8,169,519 | B1 * | 5/2012 | McClatchie ....... H04N 5/23277 348/241 |

(Continued)

FOREIGN PATENT DOCUMENTS

| EP | 2770728 A2 | 8/2014 |
| EP | 2770728 A3 | 9/2016 |

(Continued)

OTHER PUBLICATIONS

Extended European Search Report Received for European Patent Application No. 14275028.0, dated Aug. 8, 2016, 7 Pages.

(Continued)

*Primary Examiner* — Nicholas G Giles
(74) *Attorney, Agent, or Firm* — Schwegman Lundberg & Woessner, P.A.

(57) ABSTRACT

Correcting image distortion during camera motion using a system including a processor and a camera having a rolling shutter. Multiple image frames are captured by the camera equipped with the rolling shutter. The captured image frames include a base image frame and a previous image frame. Multiple time stamps are recorded respectively for multiple corresponding image points in the previous and base image frames. For the corresponding image points, multiple ego-motions are computed responsive to the time stamps of the corresponding image points of the base image frame and the previous image frame to correct the image distortion caused by the rolling shutter.

47 Claims, 2 Drawing Sheets

(56) References Cited

U.S. PATENT DOCUMENTS

| | | | |
|---|---|---|---|
| 8,456,517 B2 | 6/2013 | Spektor et al. | |
| 8,488,895 B2 | 7/2013 | Muller et al. | |
| 8,643,752 B1* | 2/2014 | McClatchie | H04N 5/23277 348/207.99 |
| 8,744,169 B2* | 6/2014 | Othmezouri | G06T 7/2086 348/42 |
| 8,786,716 B2* | 7/2014 | Zhou | H04N 5/23258 348/208.1 |
| 8,913,140 B2* | 12/2014 | Zhou | H04N 5/2329 348/208.1 |
| 9,277,132 B2 | 3/2016 | Berberian | |
| 2005/0111698 A1* | 5/2005 | Kawai | B60R 1/00 382/103 |
| 2005/0140670 A1* | 6/2005 | Wu | G06T 17/20 345/419 |
| 2007/0120997 A1* | 5/2007 | Sasaki | H04N 5/23248 348/362 |
| 2011/0074927 A1* | 3/2011 | Perng | H04N 13/0239 348/46 |
| 2011/0211082 A1* | 9/2011 | Forssen | H04N 5/23248 348/208.2 |
| 2012/0308114 A1* | 12/2012 | Othmezouri | G05D 1/0253 382/154 |
| 2013/0044230 A1* | 2/2013 | Zhou | H04N 5/2329 348/208.6 |
| 2013/0044241 A1* | 2/2013 | Zhou | H04N 5/23258 348/241 |

FOREIGN PATENT DOCUMENTS

| | | |
|---|---|---|
| WO | 2012/175703 A1 | 12/2012 |
| WO | 2013/151873 A1 | 10/2013 |

OTHER PUBLICATIONS

Final Office Action received for U.S Appl. No. 14/185,217, dated Jul. 16, 2015, 8 Pages.

Forssen et al., "Computer Vision on Rolling Shutter Cameras Part II: Rolling Shutter Geometry", Computer Vision Laboratory Dept of Electrical Engineering Linkoping University, Jun. 2012, 35 pages.

Hanning et al., "Stabilizing Cell Phone Video Using Inertial Measurement Sensors", IEEE International Conference on Computer Vision Workshops (ICCV Workshops), 2011, 8 Pages.

Hedborg et al., "Rolling Shutter Bundle Adjustment", 2012 IEEE Conference on Computer Vision and Pattern Recognition (CVPR), 2012, pp. 1434-1441.

Hedborg et al., "Structure and Motion Estimation From Rolling Shutter Video", IEEE International Conference on Computer Vision Workshops (ICCV Workshops), 2011, pp. 17-23.

Irani et al., "Recovery of Ego-Motion Using Region Alignment", IEEE Transactions on Pattern Analysis and Machine Intelligence, vol. 19, No. 3, Mar. 1997, pp. 268-272.

Klingner et al., "Street View Motion-from-Structure-from-Motion", IEEE International Conference on Computer Vision, 2013, pp. 953-960.

Meingast et al., "Geometric Models of Rolling-Shutter Cameras", arXiv:cs/0503076v1, 2005, 8 Pages.

Non Final Office Action received for U.S. Appl. No. 14/185,217, dated Mar. 10, 2015, 9 pages.

Notice of Allowance received for U.S. Appl. No. 14/185,217, dated Oct.28, 2015, 5 Pages.

Oth et al., "Rolling Shutter Camera Calibration", IEEE Conference on Computer Vision and Pattern Recognition, 2013, pp. 1360-1367.

\* cited by examiner

IMAGE DISTORTION CORRECTION OF A CAMERA WITH A ROLLING SHUTTER

CROSS REFERENCE TO RELATED APPLICATIONS

This application is a continuation of U.S. patent application No. 14/185,217, filed Feb. 20, 2014, now U.S. Pat. No. 9,277,132, issued Mar. 1, 2016, which claims priority to and the benefit of U.S. Provisional Application No. 61/767,332, filed Feb. 21, 2013, the disclosure of each of which is hereby incorporated by reference in its entirety.

BACKGROUND

1. Technical Field

The present disclosure relates to correction for distortions arising from use of a rolling shutter, and more particularly for use in a camera based driver assistance/control system.

2. Description of Related Art

Rolling shutter is a method of image acquisition in which each frame is recorded not from a snapshot of a single point in time, but rather by scanning across the image frame, for instance row by row. With a rolling shutter, not all parts of the image are recorded at exactly the same time, even though the whole frame may be displayed at the same time during playback. The rolling shutter is in contrast with a global shutter where the entire frame is exposed for the same time window.

Ego-motion "self-motion" refers to the translation and orientation (e.g. yaw, pitch and roll) in time of moving camera. A measure of ego-motion or of the camera mounted in a vehicle is important for driver assistance and/or vehicle control systems in order to accurately detect, recognize and avoid false positive detections of: other vehicles, obstacles, lights, street signs, lane markers and/or guard rails in the road environment.

Structure-from-Motion (SfM) refers to methods for recovering three-dimensional information of a scene that has been projected onto the focal plane(s) of a moving camera or multiple cameras. The structural information derived from a SfM algorithm may take the form of a set of projection matrices, one projection matrix per image frame, representing the relationship between a specific two-dimensional point in the image plane and its corresponding three-dimensional point. SfM algorithms rely on tracking specific image features from image frame to image frame to determine structural information concerning the scene.

BRIEF SUMMARY

Various systems and methods are disclosed herein for correcting image distortion during camera motion using a system including a processor and a camera having a rolling shutter. Multiple image frames are captured by the camera equipped with the rolling shutter. The captured image frames include a base image frame and a previous image frame. Multiple time stamps are recorded respectively for multiple corresponding image points in the previous and base image frames. For the corresponding image points, multiple ego-motions are computed responsive to the time stamps or capture times of the corresponding image points of the base image frame and the previous image frame to correct the image distortion caused by the rolling shutter. The computation of the ego-motions may be performed using image data from the image frames of the camera. The corresponding image points of the base image frame and the previous image frame are image points of the same object point. The computation of the ego-motions may be responsive to the time stamp difference between the corresponding image points. Image disparities may be computed based on the ego-motions. Distance to an object being imaged may be computed based on the ego-motions. The ego-motions may be determined by using an iterative process wherein an optimization goal is to minimize the distances between the epipolar lines corresponding to the image points in the previous image and the matching image points in the base image.

BRIEF DESCRIPTION OF THE DRAWINGS

The invention is herein described, by way of example only, with reference to the accompanying drawings, wherein.

Figure 1:
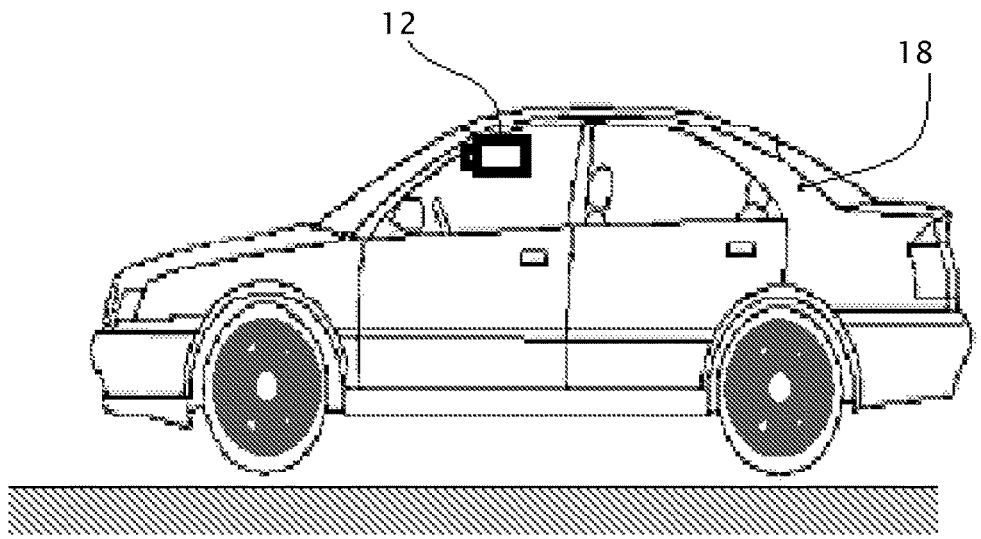
FIGS. 1 and 2 illustrate a system including a camera with a rolling shutter mountable in a vehicle, according to an aspect of the present invention.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention are based on ego-motion computations from the image data of a moving camera. When ego-motion computations are available as in driver assistance systems and/or vehicle control systems, computational resources may be saved by using the available ego-motion information. By way of example, a structure from motion (SfM) algorithm may use an ego motion matrix C which describes the ego-motion of a camera moving in real space while capturing a pair of image frames ("base" and "previous"). The SfM algorithm may use the ego motion matrix C and image point correspondences between the pair of image frames to calculate real space distances to objects being imaged. Such an ego motion matrix C describes the camera motion while capturing two image frames in which all pixels of each image frame are sampled at the same time. A rolling shutter renders the use of a single ego motion matrix C inadequate, as the motion of the camera is different for each pair of corresponding image points. Therefore, in order to fully describe the motion of the camera between two image frames, as many ego motion matrix matrices C are required as the number of corresponding pixel pairs. Such an approach would be computationally prohibitive for use in driver assistance and control systems which are required to respond in real time.

However, assuming that the ego motion matrix C between points sampled at time t=0 is known, and that the characteristics of the camera motion did not change considerably between the two image frames, the timestamps between rows may be used to compute the real ego motion between capture times of image points. In practice, because of various other distortions the captured image undergoes (e.g. distortion from optical system and/or camera calibration distortion), a different time stamp for each pixel may be obtained and used rather than a time stamp per row. In this way, the other distortions may be considered in addition to the rolling shutter distortion by adjusting the time stamp according to the known distortion per pixel.

Figure 2:
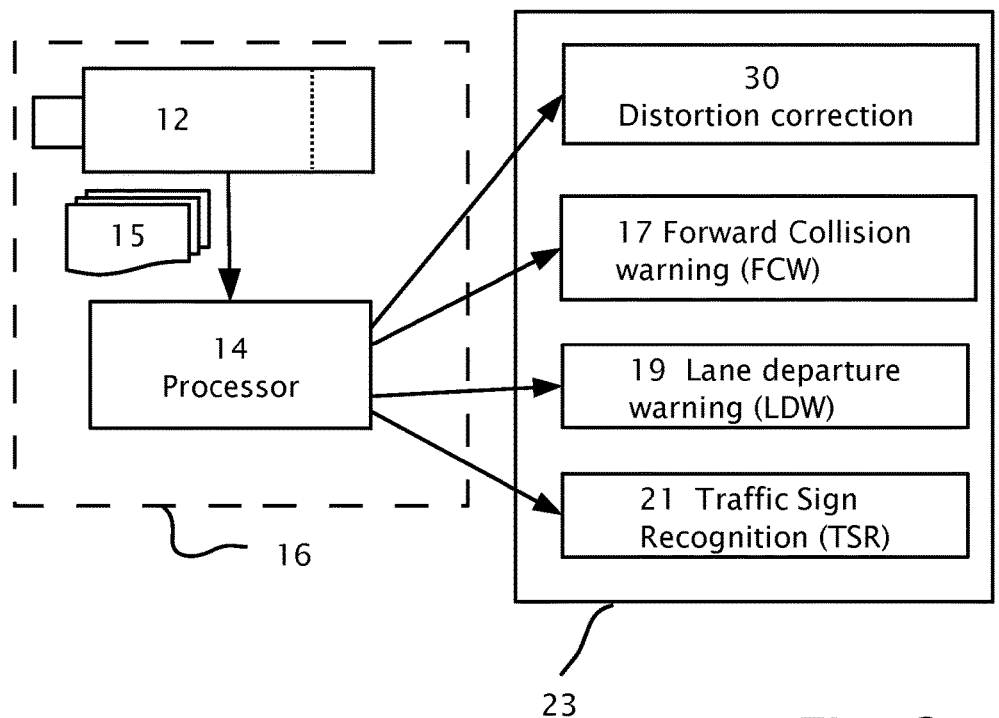

Referring now to the drawings, reference is now made to FIGS. 1 and 2 which illustrate a system 16 including a camera or image sensor 12 with a rolling shutter mountable in a vehicle 18, according to an aspect of the present invention. Image sensor 12, imaging a field of view in the forward direction typically captures in real time a time series of image frames 15. An image processor 14 may be used to process image frames 15 simultaneously and/or in parallel to serve a number of driver assistance and/or control systems. Image sensor 12 may be monochrome or black-white, i.e. without color separation. By way of example in FIG. 2, image frames 15 may be used to serve a monitor/control system 23 which may include collision warning 17, lane departure warning 19, traffic sign recognition (TSR) 21 and structure from motion (SfM) with rolling shutter distortion correction 30 according to embodiments of the present invention. Structure from motion may include for example presenting three dimensional imagery on a display to the driver, measuring distance to objects being imaged or the detection of three dimensional structures including curbs, guard rails, structural barriers, e.g. concrete lane divider. Aspects of the present invention may include exchange of information between SfM 30 and other driver assistance functions and/or systems including but not limited by FCW 17 and LDW 19. For example, a Lane Departure Warning (LDW) 19 as part of warning system 23, may respond more strongly to a lane departure towards a guard rail or a barrier rather than a lane marker or even a white line. A Forward Collision Warning (FCW) system 19 may trigger sooner if the path to either side of in-path vehicle is blocked by a guard rail or another vehicle.

The terms "camera" and "image sensor" are used herein interchangeably. The term "object" as used herein refers to an object in real space being viewed by a camera. A guard rail along the edge of a road and a lane marker in the road are examples of objects. The term "image" refers to the image of one or more objects in image space at the focal plane of camera 12. Image coordinates (x,y) in small letters refer to image space and may be in arbitrary units or numbers of picture elements in the horizontal and vertical directions with the pixel dimensions assumed.

The term "image point" as used herein refers to a point (x,y) in image space. The term "pixel" short for "picture element" and "image point" are used herein interchangeably. The term "corresponding" as used herein in the context of "corresponding" image points refers to image points of different image frames of a time sequence which have been found to be image points of the same object point. The terms "corresponding" image points and "matching" image points are used herein interchangeably.

The term "time stamp" as used herein refers to a point in time relative to a reference time which may be selected during a time sequence of image frames. The term "time stamp" as used herein is a capture time of an image point or image row of the rolling shutter. The time stamp may be further adjusted to correct for another known distortion in the camera other than that caused by the rolling shutter in which case the time stamp used is not strictly the capture time of the image point.

The term "image motion" refers to motion of an image of an object in image space. From image frame 15 to a subsequent image frame 15 the points of the image of the object may map from one set of coordinates (x1,y1) to a different set of coordinates (x2,y2). The term "image motion" refers to the mapping of coordinates of an image from image frame to image frame or a function of the mapping. The term "projection" or "projecting" as used herein refers to camera or perspective projection unless otherwise indicated by the context.

Figure 3:
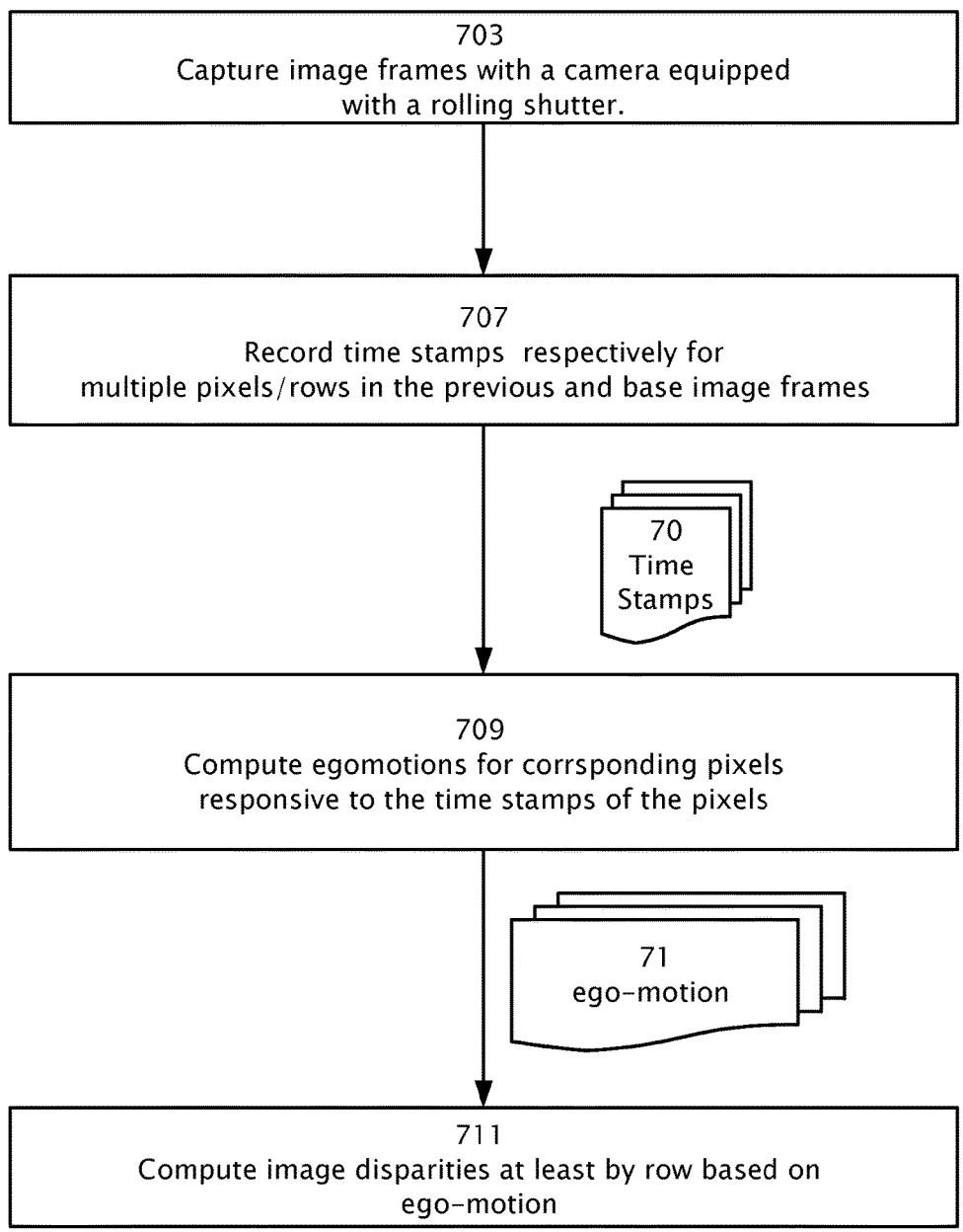
FIG. 3 illustrates a simplified method, according to embodiments of the present invention.

Reference is now also made to FIG. 3 which illustrates a simplified method 30, according to embodiments of the present invention for image distortion correction using a rolling shutter. Image frames are captured (step 703) with a camera equipped with a rolling shutter. Time stamps 70 are recorded (step 707) for multiple rows in the previous and base image frames or for multiple pixels per row in both. In step 709, ego-motion is computed on a row by row or pixel by pixel basis responsive to time stamps 70, and more particularly the ego-motion may be responsive to the difference in time stamps 70 of corresponding pixels in the previous and base image frames. Ego-motion results 71 of the rows and/or of the pixels for corresponding rows and pixels. Ego-motion results may be represented by corrections to a global ego-motion matrix which would be valid for all pixels with the use of a global shutter instead of a rolling shutter. The corrected ego-motion results may be used pixel by pixel or row by row for further image processing such as computation in step 711 of image disparities for providing or displaying structure from motion (SfM). In the description that follows, method 30 is described in further detail with SfM as an example.

As previously stated, an SfM algorithm using a global ego-motion computation assumes that all the pixels in image frame 15 are sampled simultaneously. However, when camera 12 has a rolling shutter, the assumption of simultaneous sampling for all pixels in a single image frame 15 is no longer valid. The rolling shutter therefore produces an image distortion, which affects performance of structure from motion (SfM) algorithm.

A correction to the image distortion may be applied in two stages to the original structure from motion (SfM) algorithm: A. distance estimation correction and B. ego-motion correction.

A. Distance Estimation Correction

The distance correction for the rolling shutter effect of camera 12 is presented here in four main steps. The inputs include the structure from motion (SfM) distance estimation, the ego motion matrix C, time stamps approximation and time difference between the base and previous images. Each of the following steps may be performed for every pixel of the base and previous images; or multiple pixels or multiple rows of the base and previous images:

1. Finding Image Coordinates in the Previous Image

The following equations relate the image coordinates of the base image to the image coordinates of the previous image when the global ego-motion of camera 12 is known.

$$\begin{pmatrix} x \\ y \\ f \end{pmatrix}_b \cdot \frac{Z}{f} = \begin{pmatrix} X \\ Y \\ Z \end{pmatrix}_b$$

$$C^{-1} \begin{pmatrix} X \\ Y \\ Z \\ 1 \end{pmatrix}_b = \begin{pmatrix} X \\ Y \\ Z \\ 1 \end{pmatrix}_p$$

$$\begin{pmatrix} X \\ Y \\ Z \end{pmatrix}_p \cdot \frac{f}{Z_p} = \begin{pmatrix} x \\ y \\ f \end{pmatrix}_p = x_p$$

where b refers to base image and p refers to the previous image, x,y are image coordinates, f is the focal length of camera 12 and X,Y,Z are real-space Cartesian coordinates of the object point being imaged relative to the camera coordinates. X is the horizontal coordinate, Y is the vertical coordinate and Z is the distance to the object in the forward direction. C is an ego-motion matrix under the assumption of a global shutter. $C^{-1}$ is the inverse of ego-motion matrix C.

2. Correcting the Ego Motion Matrix

The input C is the ego motion matrix that describes the real-space motion of camera 12 while capturing the previous and base image frames 15 when the rolling shutter effect is not taken into account. In other words, ego motion matrix C describes the hypothetical situation in which camera 12 does not have a rolling shutter and all the pixels are simultaneously sampled. The term "simultaneous" abbreviated as "sim" is used to describe the situation when all the pixels are sampled simultaneously. So the ego motion matrix C describes ego-motion from previous-sim image to base-sim image. The term "rolling shutter", abbreviated "RS" is used to describe the situation when all the pixels are not sampled exactly at the same moment or not sampled simultaneously, i.e camera 12 has a rolling shutter.

In order to correct the effect of the rolling shutter, the ego motion from previous-RS image frame 15 to base-RS image frame 15 is used. Let the desired ego motion matrix be denoted $C_d$. Given that the time difference between the previous and base images is dt, we obtain the following expression for the desired ego-motion matrix $C_d$:

$$C_d = C^{1+\epsilon} = C^{1+\frac{t_b - t_p}{dt}}$$

where $t_b$ and $t_p$ are the base point and previous point's time stamps respectively.

To obtain a representation of the time stamp of a pixel, a polynomial approximation may be used of ego-motion variation due to the rolling shutter. The power of the ego motion matrix C is calculated approximately, using a first order Taylor expansion. The first order Taylor expansion is linear where approximation of $C^\epsilon$, for ε is small, yields the following result:

$$C^\epsilon \approx \begin{pmatrix} I + \epsilon \log R & \epsilon \frac{\log R}{R-I} t \\ 0 & 1 \end{pmatrix}$$

$$C = \begin{pmatrix} R & t \\ 0 & 1 \end{pmatrix}$$

where R is a rotation matrix and I is an identity matrix.

3. Calculating Distance Considering Rolling Shutter Effect

The distance is recalculated in the following way:

1. The previous coordinates $x_p, y_p$ of the previous image frame are rotated to match the base coordinate $x_b, y_b$ of the base image frame so that camera 12 recording the previous image and camera 12 recording the base image are parallel and have the same focus of expansion (FOE)).

2. The focus of expansion FOE is calculated by the following equation:

$$FOE(x, y) = (t_x, t_y) \frac{f}{t_z}$$

where $t_x$, $t_y$, $t_z$ are the translation vector components.

3. The disparity, d, is calculated: $d = r_b - r_p$, where $r_b$ is the distance from the pixel to the FOE in the base image and $r_p$ is the same for the previous image.

4. Finally, the distance is calculated:

$$Z_{new} = \frac{-t_z \cdot r_p}{d}$$

4. Final Correction of the Distance

By now the exact distance $Z_{new}$ to each object point imaged by an image point in the base image may be obtained, in real time, which is the real distance at the exact moment in which the image point was recorded. The real distance to each object point imaged by an image point in the exact moment in which the image point was recorded is not the distance sought. Instead it is desired to cancel the effect of the rolling shutting while camera 12 is moving d. What is needed is the distance obtained if camera 12 had no rolling shutter. To get the distance if camera 12 had no rolling shutter, the time stamp of the base pixel is used, to get the following ego motion matrix under assumption of the rolling shutter:

$$C^{\frac{-t_b}{dt}}$$

Multiplying the ego motion matrix in the new base world point found, gets the final world point and the desired distance from it. The corrected ego motion matrices under assumption of the rolling shutter may be used in equations of section A1 to determine the previous image coordinates. The previous image coordinates may be used to determine the distances and disparities under assumption of a rolling shutter from the equations in section A3 above.

B. Ego Motion Estimation Correction

As stated previously, the original structure from motion (SfM) algorithm includes a stage in which the ego motion matrix C is calculated. As explained in the previous section, in the presence of rolling shutter distortions, the matrix which describes the camera 12 movement from previous-RS to base-RS would be $C^\alpha$, where the ego motion matrix C is the camera matrix from previous-sim image to base-sim image is:

$$\alpha = 1 + \epsilon = 1 + \frac{t_b - t_p}{dt}$$

and therefore ε is small. In essence, the rolling shutter effect correction is applied to this stage by replacing the ego motion matrix C with $C^\alpha$ pixel by pixel or row by row and adjusting all the equations previously presented accordingly.

Ego Motion Estimation in the Structure from Motion (SfM) Algorithm

In order to find the ego motion matrix, the structure from motion (SfM) algorithm uses an iterative process where the optimization goal is to minimize the distances between the epipolar lines corresponding to the previous points and the matching base points. Each iteration includes the following steps:

1. Both cameras 12 (previous and base camera 12 orientations) are rotated so that the line connecting their centers would be perpendicular to both image planes. This rotation is done assuming that the matrix $R_p$ and translation vector $t_p$ obtained in the previous iteration (or given as the initial guess) describe the motion from previous to base.

2. In this position the new rotation matrix would be approximately I and the translation vector would be close to:

$$(0\ 0\ -1)^T$$

Thus, after the rotation is done in the first step, the rotation matrix and translation vector between the cameras may be written as:

$$R = I + \Delta \begin{pmatrix} 1 & -r & y \\ r & 1 & p \\ -y & -p & 1 \end{pmatrix}$$

and $$t = \begin{pmatrix} a \\ b \\ -1 \end{pmatrix}$$

where r, y, p, a, b are unknown parameters assumed to be small.

3. Let v be a point in the base image, and let u be the corresponding point in the previous image (these points are the result of an earlier point matching stage). Let $\tilde{v}$ and $\tilde{u}$ be these points in the coordinate systems of the rotated cameras (step B1). The distance between v and the epipolar line determined by $\tilde{u}$ is:

$$D = \frac{\tilde{v}^T t_x R \tilde{u}}{\sqrt{w_1^2 + w_2^2}}$$

where $$w = t_x R u = (w_1\ w_2\ w_3)^T$$

D=0 is an equation with five unknowns (r, y, p, a, b); so there are as many such equations as the number of point pairs. Neglecting second-order terms, new R and t are obtained by solving a system of linear equations.

Rolling Shutter Distortion Correction

Having no rolling shutter effects, the ego motion matrix from base image to previous image is:

$$C = \begin{pmatrix} \tilde{R}_2^{-1} & 0 \\ 0 & 1 \end{pmatrix} P \begin{pmatrix} \tilde{R}_1 & 0 \\ 0 & 1 \end{pmatrix}$$

where the first and last matrices describe the rotation of the cameras back to their original position, $$P = t_x R = \left( I + \Delta \begin{pmatrix} a \\ b \\ -1 \end{pmatrix} \right)$$

and translation vector t and rotation matrix R describe the motion between the parallel cameras-after step B1).

Considering the rolling shutter effect, the corrected ego motion matrix would be $$C^\alpha = \begin{pmatrix} \tilde{R}_2^{-1} & 0 \\ 0 & 1 \end{pmatrix} P_\alpha \begin{pmatrix} \tilde{R}_1 & 0 \\ 0 & 1 \end{pmatrix}$$

and thus:

$$P_\alpha = t_\alpha \times R_\alpha = \begin{pmatrix} \tilde{R}_2 & 0 \\ 0 & 1 \end{pmatrix} C^\alpha \begin{pmatrix} \tilde{R}_1^{-1} & 0 \\ 0 & 1 \end{pmatrix}$$

Expanding this expression and using first order Taylor expansions gives the corrected expressions for the translation and rotation matrices, and a new equation (D=0) with the same five unknowns is obtained, only here it incorporates the time stamp difference between pixels caused by the rolling shutter.

The indefinite articles "a" and "an" is used herein, such as "a camera", "an image frame" have the meaning of "one or more" that is "one or more cameras" or "one or more image frames".

Although selected embodiments of the present invention have been shown and described, it is to be understood the present invention is not limited to the described embodiments. Instead, it is to be appreciated that changes may be made to these embodiments, the scope of which is defined by the claims and the equivalents thereof.

What is claimed is:

1. A system for processing images captured by a moving rolling shutter camera, the system comprising:
   an interface configured to receive, from the rolling shutter camera, a plurality of images of an environment of the camera, captured while the camera is moving;
   a processor configured to:
      compute, for a first image and a second image from the plurality of images, a global ego-motion translation and a global ego-motion rotation of the camera between the first image and the second image;
      apply a rolling shutter distortion correction to the global ego-motion translation and to the global ego-motion rotation of the camera to give rise to a corrected global ego-motion translation and a corrected global ego-motion rotation of the camera;

apply the corrected global ego-motion rotation and the corrected global ego-motion translation to the first image to give rise to a corrected first image; and match pixels' locations in the corrected first image with respective pixels' locations in at least the second image.

2. The system according to claim 1, wherein the global ego-motion translation and the global ego-motion rotation of the camera is represented by data assuming that all pixels of the first image were captured simultaneously at a first capture time and that all pixels of the second image were captured simultaneously at a second capture time.

3. The system according to claim 2, wherein the processor is configured to perform the correction for the global ego-motion translation and the global ego-motion rotation of the camera by taking into account the data representing the ego-motion of the camera between the assumed first capture time and the assumed second capture time.

4. The system according to claim 2, wherein the global ego-motion translation and the global ego-motion rotation include a translation and a rotation of the camera between the first capture time of the first image and the second capture time of the second image.

5. The system according to claim 1, wherein the correction of the first image for the rolling shutter distortion uses a plurality of different time values, for respective rows or for respective pixels in the first image.

6. The system according to claim 5, wherein the time values correspond to capture times of the respective rows or pixels during operation of the rolling shutter camera.

7. The system according to claim 5, wherein the processor is configured to perform the rolling shutter distortion correction by taking into account data representing a motion of the camera between exposure times of different rows of the rolling shutter camera.

8. The system according to claim 1, wherein the processor is further configured to:

utilize an ego-motion matrix to process the first image, apply a global ego-motion correction to the ego-motion matrix, wherein the global ego-motion correction does not take into account different exposure times of different rows or different pixels of the rolling shutter camera with respect to the first image; and apply a polynomial expression representing ego-motion variation between different rows or different pixels due to the rolling shutter camera.

9. The system according to claim 1, wherein the processor is further configured to adjust a time stamp associated with a picture element in the first image according to a predefined distortion per picture element model.

10. The system according to claim 1, wherein the processor is configured to:

identify a plurality of pairs of image points, wherein a first image point of a given pair of image points is an image point in the corrected first image, and a second image point of the image point pair is a point in the second image which corresponds to the first image point;

associate each of the first and the second image points in each pair of image points with respective first and second epipolar lines; and determine a distance between the first and second epipolar lines of each pair of image points.

11. The system according to claim 1, wherein the processor is further configured to compute depth information based on locations of pixels in the corrected first image and based on locations of corresponding pixels in at least the second image.

12. The system according to claim 1, wherein the processor is further configured to determine a distance to at least a portion of an object imaged in the first image and in the second image based on a relation between corresponding pixel locations in the first and second images.

13. A method for processing images captured by a moving rolling shutter camera, the method comprising:

configuring an interface to receive, from the rolling shutter camera, a plurality of images of an environment of the camera, captured while the camera is moving;

configuring a processor to:

compute, for a first image and a second image from the plurality of images, a global ego-motion translation and a global ego-motion rotation of the camera between the first image and the second image;

apply a rolling shutter distortion correction to the global ego-motion translation and to the global ego-motion rotation to give rise to a corrected global ego-motion translation and a corrected global ego-motion rotation of the camera;

apply the corrected global ego-motion rotation and the corrected global ego-motion translation to the first image to give rise to a corrected first image; and match pixels' locations in the corrected first image with respective pixels' locations in at least the second image.

14. The method according to claim 13, further comprising:

representing the global ego-motion translation and the global ego-motion rotation by data assuming that all pixels of the first image were captured simultaneously at a first capture time and that all pixels of the second image were captured simultaneously at a second capture time.

15. The method according to claim 14, further comprising:

configuring the processor to perform the correction for the global ego-motion translation and the global ego-motion rotation by taking into account the data representing the global ego-motion of the camera between the assumed first capture time and the assumed second capture time.

16. The method according to claim 14, wherein the global ego-motion translation and the global ego-motion rotation include at least one of: a translation and a rotation of the camera between a capture time of the first image and a capture time of the second image.

17. The method according to claim 13, further comprising:

configuring the processor to use a plurality of different time values for rolling-shutter distortion correction for respective rows or for respective pixels in the first image.

18. The method according to claim 17, wherein the time values correspond to capture times of the respective rows or pixels during operation of the rolling shutter camera.

19. The method according to claim 17, further comprising:

configuring the processor to perform the rolling shutter distortion correction by taking into account data representing a motion of the camera between exposure times of different rows of the rolling shutter camera.

20. The method according to claim 13, further comprising:

configuring the processor to:
utilize an ego-motion matrix to process the first image,
apply a global ego-motion correction to the ego-motion matrix, wherein the global ego-motion correction does not take into account different exposure times of different rows or different pixels of the rolling shutter camera with respect to the first image, and
apply a polynomial expression representing ego-motion variation between different rows or different pixels due to the rolling shutter camera.

21. The method according to claim 13, further comprising:
configuring the processor to adjust a time stamp associated with a pixel in the first image according to a predefined distortion per picture element model.

22. The method according to claim 13, further comprising:
configuring the processor to:
identify a plurality of pairs of image points, wherein a first image point of a given pair of image points is an image point in the corrected first image, and a second image point of the image point pair is a point in the second image which corresponds to the first image point;
associate each of the first and the second image points in each pair of image points with respective first and second epipolar lines; and
determine a distance between the first and second epipolar lines of each pair of image points.

23. The method according to claim 13, further comprising:
configuring the processor to compute depth information based on locations of pixels in the corrected first image and based on locations of corresponding pixels in at least the second image.

24. The method according to claim 13, further comprising:
configuring the processor to determine a distance to at least a portion of an object imaged in the first image and in the second image based on a relation between corresponding pixel locations in the first and second images.

25. A method for processing images captured by a moving rolling shutter camera, the method comprising:
receiving, from the rolling shutter camera, a plurality of images of an environment of the camera, captured while the camera is moving;
computing, for a first image and a second image from the plurality of images, a global ego-motion translation and a global ego-motion rotation of the camera between the first image and the second image;
applying a rolling shutter distortion correction to the global ego-motion translation and to the global ego-motion rotation to give rise to a corrected global ego-motion translation and a corrected global ego-motion rotation of the camera;
applying the corrected global ego-motion rotation and the corrected global ego-motion translation to the first image to give rise to a corrected first image; and
matching pixels' locations in the corrected first image with respective pixels' locations in at least the second image.

26. The system according to claim 1, wherein applying a rolling shutter distortion correction comprises:
correcting an ego-motion matrix representing ego-motion of the rolling shutter camera between capture of the first image and the second image; and
using the corrected ego-motion matrix to process the first image.

27. The system according to claim 26, wherein correcting the ego-motion matrix comprises:
determining a plurality of corrected ego-motion matrices, wherein each corrected ego-motion matrix of the plurality corresponds to a respective pixel or row of the first image.

28. The system according to claim 26, wherein the processor is further configured to:
determine, based at least in part on the corrected ego-motion matrix, three-dimensional structural information about the environment of the camera.

29. The method according to claim 13, wherein applying a rolling shutter distortion correction comprises:
correcting an ego-motion matrix representing ego-motion of the rolling shutter camera between capture of the first image and the second image; and
using the corrected ego-motion matrix to process the first image.

30. The method according to claim 29, wherein correcting the ego-motion matrix comprises:
determining a plurality of corrected ego-motion matrices, wherein each corrected ego-motion matrix of the plurality corresponds to a respective pixel or row of the first image.

31. The method according to claim 29, further comprising:
configuring the processor to determine, based at least in part on the corrected ego-motion matrix, three-dimensional structural information about the environment of the camera.

32. A non-transitory computer readable medium, for processing images captured by a moving rolling shutter camera, configured to cause a processor to:
receive, from the rolling shutter camera, a plurality of images of an environment of the camera, captured while the camera is moving;
compute, for a first image and a second image from the plurality of images, a global ego-motion translation and a global ego-motion rotation of the camera between the first image and the second image;
apply a rolling shutter distortion correction to the global ego-motion translation and to the global ego-motion rotation to give rise to a corrected global ego-motion translation and a corrected global ego-motion rotation of the camera;
apply the corrected global ego-motion rotation and the corrected global ego-motion translation to the first image to give rise to a corrected first image; and
match pixels' locations in the corrected first image with respective pixels' locations in at least the second image.

33. The computer readable medium according to claim 32, wherein the global ego-motion translation and the global ego-motion rotation of the camera is represented by data assuming that all pixels of the first image were captured simultaneously at a first capture time and that all pixels of the second image were captured simultaneously at a second capture time.

34. The computer readable medium according to claim 33, further configured to cause the processor to perform the correction for the global ego-motion translation and the global ego-motion rotation of the camera by taking into account the data representing the ego-motion of the camera between the assumed first capture time and the assumed second capture time.

35. The computer readable medium according to claim 33, wherein the global ego-motion translation and the global ego-motion rotation include a translation and a rotation of the camera between the first capture time of the first image and the second capture time of the second image.

36. The computer readable medium according to claim 32, wherein the correction of the first image for the rolling shutter distortion uses a plurality of different time values, for respective rows or for respective pixels in the first image.

37. The computer readable medium according to claim 36, wherein the time values correspond to capture times of the respective rows or pixels during operation of the rolling shutter camera.

38. The computer readable medium according to claim 36, further configured to cause the processor to perform the rolling shutter distortion correction by taking into account data representing a motion of the camera between exposure times of different rows of the rolling shutter camera.

39. The computer readable medium according to claim 32, further configured to cause the processor to:
   utilize an ego-motion matrix to process the first image,
   apply a global ego-motion correction to the ego-motion matrix, wherein the global ego-motion correction does not take into account different exposure times of different rows or different pixels of the rolling shutter camera with respect to the first image; and
   apply a polynomial expression representing ego-motion variation between different rows or different pixels due to the rolling shutter camera.

40. The computer readable medium according to claim 32, further configured to cause the processor to adjust a time stamp associated with a picture element in the first image according to a predefined distortion per picture element model.

41. The computer readable medium according to claim 32, further configured to cause the processor to:
   identify a plurality of pairs of image points, wherein a first image point of a given pair of image points is an image point in the corrected first image, and a second image point of the image point pair is a point in the second image which corresponds to the first image point;
   associate each of the first and the second image points in each pair of image points with respective first and second epipolar lines; and
   determine a distance between the first and second epipolar lines of each pair of image points.

42. The computer readable medium according to claim 32, further configured to cause the processor to compute depth information based on locations of pixels in the corrected first image and based on locations of corresponding pixels in at least the second image.

43. The computer readable medium according to claim 32, further configured to cause the processor to determine a distance to at least a portion of an object imaged in the first image and in the second image based on a relation between corresponding pixel locations in the first and second images.

44. The computer readable medium according to claim 32, wherein applying a rolling shutter distortion correction comprises:
   correcting an ego-motion matrix representing ego-motion of the rolling shutter camera between capture of the first image and the second image; and
   using the corrected ego-motion matrix to process the first image.

45. The computer readable medium according to claim 44, wherein correcting the ego-motion matrix comprises:
   determining a plurality of corrected ego-motion matrices, wherein each corrected ego-motion matrix of the plurality corresponds to a respective pixel or row of the first image.

46. The computer readable medium according to claim 44, further configured to cause the processor to:
   determine, based at least in part on the corrected ego-motion matrix, three-dimensional structural information about the environment of the camera.

47. The system according to claim 1, wherein the global ego-motion translation and the global ego-motion rotation of the camera are represented by a global ego-motion matrix.

* * * * *

UNITED STATES PATENT AND TRADEMARK OFFICE
CERTIFICATE OF CORRECTION

PATENT NO. : 10,079,975 B2
APPLICATION NO. : 15/055723
DATED : September 18, 2018
INVENTOR(S) : Yael Berberian Page 1 of 1

It is certified that error appears in the above-identified patent and that said Letters Patent is hereby corrected as shown below:

On the Title Page

Item (71), in "Applicant", in Column 1, Line 2, before "Jerusalem", insert --Har Hotzvim,--

Signed and Sealed this
Fourth Day of June, 2019

Andrei Iancu
*Director of the United States Patent and Trademark Office*